US009367070B2

(12) United States Patent
Greenwood et al.

(10) Patent No.: US 9,367,070 B2
(45) Date of Patent: Jun. 14, 2016

(54) PRESSURE REGULATOR HAVING SINGLE STRUT SEAT WITH STRUT COAXIAL TO PLUNGER

(71) Applicant: Nelson Irrigation Corporation, Walla Walla, WA (US)

(72) Inventors: Riley D. Greenwood, Walla Walla, WA (US); Craig B. Nelson, Walla Walla, WA (US)

(73) Assignee: Nelson Irrigation Corporation, Walla Walla, WA (US)

(*) Notice: Subject to any disclaimer, the term of this patent is extended or adjusted under 35 U.S.C. 154(b) by 12 days.

(21) Appl. No.: 14/252,035

(22) Filed: Apr. 14, 2014

(65) Prior Publication Data

US 2015/0293539 A1 Oct. 15, 2015

(51) Int. Cl.
*G05D 16/06* (2006.01)
*G05D 16/10* (2006.01)

(52) U.S. Cl.
CPC ........ *G05D 16/0608* (2013.01); *G05D 16/0636* (2013.01); *G05D 16/103* (2013.01); *Y10T 137/7793* (2015.04)

(58) Field of Classification Search
CPC ............. G05D 16/0608; G05D 16/065; Y10T 137/7793; Y10T 137/7808; Y10T 137/781; Y10T 137/7812; Y10T 137/782
See application file for complete search history.

(56) References Cited

U.S. PATENT DOCUMENTS

| 4,543,985 | A | 10/1985 | Healy et al. |
| 5,875,815 | A | 3/1999 | Ungerecht et al. |
| 5,881,757 | A | 3/1999 | Kuster et al. |
| 6,758,238 | B2 | 7/2004 | Callies |
| 7,048,001 | B2 | 5/2006 | Youngberg et al. |
| 7,140,595 | B2 | 11/2006 | Youngberg et al. |
| 7,401,622 | B2 | 7/2008 | Ungerecht |
| 2005/0224117 | A1 | 10/2005 | Youngberg et al. |
| 2007/0284004 | A1 | 12/2007 | Ungerecht |
| 2012/0285561 | A1 | 11/2012 | Lawyer et al. |

FOREIGN PATENT DOCUMENTS

FR 1555748 A 1/1969

OTHER PUBLICATIONS

American Cast Iron Pipe Company Jul. 26, 2012 Flanged Fittings, 11 ¼degree bends https://web.archive.org/web/20120726001441/http://www.american-usa.com/products/ductile-iron-pipe-and-fittings/fittings/flanged-fittings/bends.*
International Search Report and Written Opinion of the International Searching Authority in International Patent Application No. PCT/US2015/025740, mailed Jul. 23, 2015, ten pages.

* cited by examiner

*Primary Examiner* — Mary McManmon
*Assistant Examiner* — Patrick Williams
(74) *Attorney, Agent, or Firm* — Nixon & Vanderhye P.C.

(57) ABSTRACT

A pressure regulator including a housing including an inlet flow passage and an outlet flow passage; a plunger reciprocally mounted in the housing and including a plunger flow passage having an axis offset from an axis of the inlet flow passage, and a stationary valve seat fixed to the housing and positioned between the inlet flow passage and an inlet to the flow passage of the plunger, wherein the valve seat is configured to receive and abut the inlet to the flow passage of the plunger.

46 Claims, 11 Drawing Sheets

PRESSURE REGULATOR HAVING SINGLE STRUT SEAT WITH STRUT COAXIAL TO PLUNGER

BACKGROUND OF THE INVENTION

The invention relates to pressure regulators and particularly to pressure regulators for supplying water to irrigation sprinklers and nozzles.

Irrigation systems often have several sprinklers and nozzles arranged along an extended water supply pipe. For example, a water supply pipe in a center pivot irrigation system may extend a quarter to half a mile (400 to 800 meters). The water supply pipe may have a diameter of six to ten inches (152 to 254 millimeters) and provide water for over a hundred sprinklers arranged along the pipe. Each sprinkler is typically connected to the water supply pipe by a smaller water pipe that extends vertically and includes a pressure regulator.

The sprinklers are typically designed to receive water under a relatively low pressure and within a narrow pressure range. Pressure regulators reduce the pressure in the water supply pipe to a pressure suitable for a sprinkler or nozzle. The pressure regulator ensures that the water pressure is within the design range of the sprinkler or nozzle.

The elevation of the water supply pipe in an irrigation system rises and falls as the pipe travels over the hills and low points of an agricultural field. These changes in elevation vary the pressure in the water supply pipe. The pressure regulators adjust to the changes in pressure such that water flows to the sprinklers and nozzles at a relatively uniform pressure.

Nelson Irrigation Corporation of Walla Walla, Wash., U.S.A., manufactures and sells flow-through type pressure regulators having a tubular housing with an inlet at one end and an outlet at the other end. Pressure loss through the regulator is controlled by a gap between a valve seat and a tubular plunger in the regulator. The tubular plunger is biased away from the valve seat in a normally open condition by a compression spring. The pressure of the flow at the outlet of the regulator acts on a diaphragm in the regulator. The diaphragm is attached to and moves with the plunger.

Within a normal operating flow rate range, the spring force balances against the outlet pressure applied to the diaphragm. This balance sets the opening between the valve seat and the plunger to cause the desired pressure loss at the flow rate demanded by the sprinkler. An increase in the inlet pressure will initially increase the pressure at the outlet and thus increase the pressure on the diaphragm. Due to the pressure increase, the diaphragm moves the tubular plunger towards the valve seat to narrow the gap and reduce the pressure at the outlet of the regulator. The counteracting forces of the spring and the outlet flow pressure move the plunger and adjust the gap to achieve a substantially uniform outlet pressure of the flow leaving the pressure regulator.

The valve seat and a strut(s) supporting the valve seat tend to collect debris from the water flow. Water for the sprinklers is often drawn from ponds and irrigation ditches near agricultural fields. The water is dirty with suspended grasses, other plant material and other debris. The grass and other fibrous debris can wrap around and collect on the valve seat and its support strut(s). Debris collecting on the valve seat and strut obstructs the flow through the regulation gap and can interfere with the movement of the plunger. The debris can impair the operation of the pressure regulator, causing the pressure of the output flow to vary from the desired output pressure, reducing the rate of flow through the pressure regulator, and causing excessive pressure losses through the regulator.

Efforts to prevent debris from collecting on the valve seat and strut include having a cantilever-beam type single strut which is less likely to collect debris than multiple struts. See U.S. Pat. Nos. 7,048,001 and 7,140,595 and U.S. Patent Publication 2012/0285561. While a single strut has been successful in suppressing the collection of debris on the strut and valve seat, there remains a continuing problem of debris collecting on or near the strut and valve seat in a pressure regulator.

A pressure regulator having an adjustable valve seat is shown in U.S. Pat. No. 7,401,622, wherein the valve seat is substantially offset from the flow passage so that the valve seat may function as an On-Off valve. Shifting the seat to such an extent resulted in extreme turns in the water passage near the valve seat and inlet to the plunger. The extreme turns tend to cause excessive pressure losses and nonuniform flow at the outlet. Thus, there is a continuing need to reduce pressure losses in pressure regulators and for the regulators to discharge water in a flow that has a relatively uniform velocity profile.

BRIEF SUMMARY OF THE INVENTION

A pressure regulator has been conceived having a valve seat that is offset from the direction of flow through the regulator. The offset shifts the valve seat and the strut supporting the valve seat towards the sidewall of the inlet casing and slightly out of the center of the flow passage. The offset allows for a more uniform expansion of the flow passage surrounding the valve seat and strut, as compared to the flow passage surrounding a strut and valve in a conventional regulator in which the plunger is coaxial with the inlet flow passage. The enlarged flow passage has an increased hydraulic diameter which results in lower frictional pressure losses of water flowing through the regulator and provides an enhanced flow passage around the valve seat and strut and into the plunger.

The shift of the valve seat and strut reduces the radial dimension of the strut and allows the strut to be more closely associated, e.g., integrated, with the sidewall of the regulator housing. By reducing the radial dimension of the strut that extends into the flow passage, the force moment applied by the water flow to the strut is reduced. The strut may have a generally triangular shape with a vertical leg of the triangle attached to the sidewall, a horizontal leg extending to the valve seat and a sloped leg extending downstream from the sidewall to the valve seat. The sloped leg faces the water flow. Debris slides down the sloped leg and does not catch on the strut. The strut may also have a generally cylindrical section that extends towards the plunger.

The strut may include a post extending downstream into the chamber surrounding the strut and valve seat. The post may extend from an interior sidewall of the regulator housing. The strut may be connected to the wall of the housing along an extended length of the wall. The extended connection and shape of the strut form a strong support for the valve seat. The strut is in contrast to the traditional cantilevered strut which is subject to bending forces applied by the water flow.

The triangular brace shape of the strut allows the strut to be integrated into the inlet housing. The inlet strut and valve seat may be formed as a single plastic injection molded component utilizing collapsible core or unwinding core molding technology. In a conventional pressure regulator, the inlet casing is typically formed separately from the strut and valve seat.

A pressure regulator has been conceived comprising a housing including an inlet flow passage and an outlet flow passage; a plunger reciprocally mounted in the housing and including a plunger flow passage having an axis offset from an axis of the inlet flow passage and a stationary valve seat fixed to the housing and positioned between the inlet flow passage and an inlet to the flow passage of the plunger, wherein the valve seat is configured to receive and abut the inlet to the flow passage of the plunger.

The offset may be an angular offset between the axis of the plunger flow passage and the axis of the inlet flow passage, wherein the angular offset, as determined by testing, is in a range of three to twelve and one-half degrees. Further, the axis of the inlet flow passage is coaxial with an axis of the outlet flow passage, and the axis of the plunger flow passage intersects the axis of the inlet flow passage proximate to the outlet of the flow passage in the plunger.

The stationary valve seat in the pressure regulator may be integral with the inlet cap of the housing. The valve seat may be formed within or at the end of a strut attached to an interior wall of the housing. The strut may include an upstream surface sloping out radially in a downstream direction along the entire length of the surface from the interior wall to a nose of the strut. The nose of the strut may include a distal circumferential edge, bisected by a radical axis defined by the intersection of the inlet passage's cylindrical envelope and the valve seat circumference's elliptical projection normal to the inlet axis. The strut may also include a downstream cylindrical section coaxial with the axis of the plunger.

The housing for the pressure regulator may include an inlet cap and an outlet cap, and the strut is integral with the inlet cap. The inlet cap, valve seat and strut may be a single plastic component. Further, vane(s) may be positioned between the strut and an interior surface of the housing to direct water through the regulator, and mitigate vortexing flow conditions in the flow chamber around the seat's strut.

In another embodiment, the pressure regulator may comprise a housing including an inlet cap having an inlet flow passage and an outlet cap having an outlet flow passage; a tubular plunger reciprocally mounted in the housing; a flow passage including the inlet flow passage, the plunger and the outlet flow passage; a stationary valve seat connected to the housing and positioned between the inlet flow passage and an inlet to the plunger, wherein the valve seat is configured to receive and abut the inlet to the plunger, and a strut supporting the valve seat, wherein the strut is integral with the inlet cap. The stationary valve seat, a strut supporting the seat and the inlet cap may be formed as a single component by plastic injection molding.

DETAILED DESCRIPTION OF THE INVENTION

Figure 1:
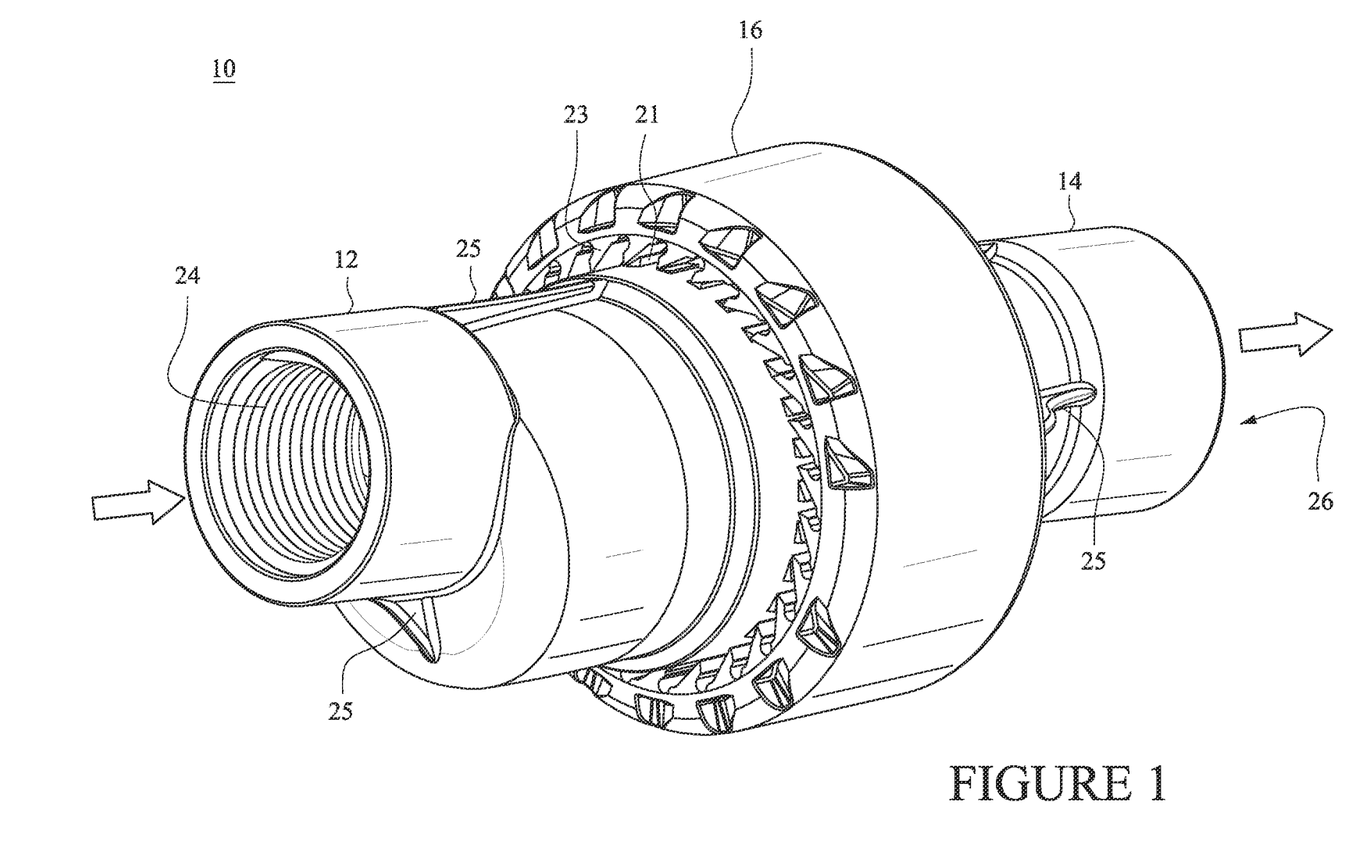
FIG. 1 is a perspective view of the inlet and side of a pressure regulator.
Figure 2:
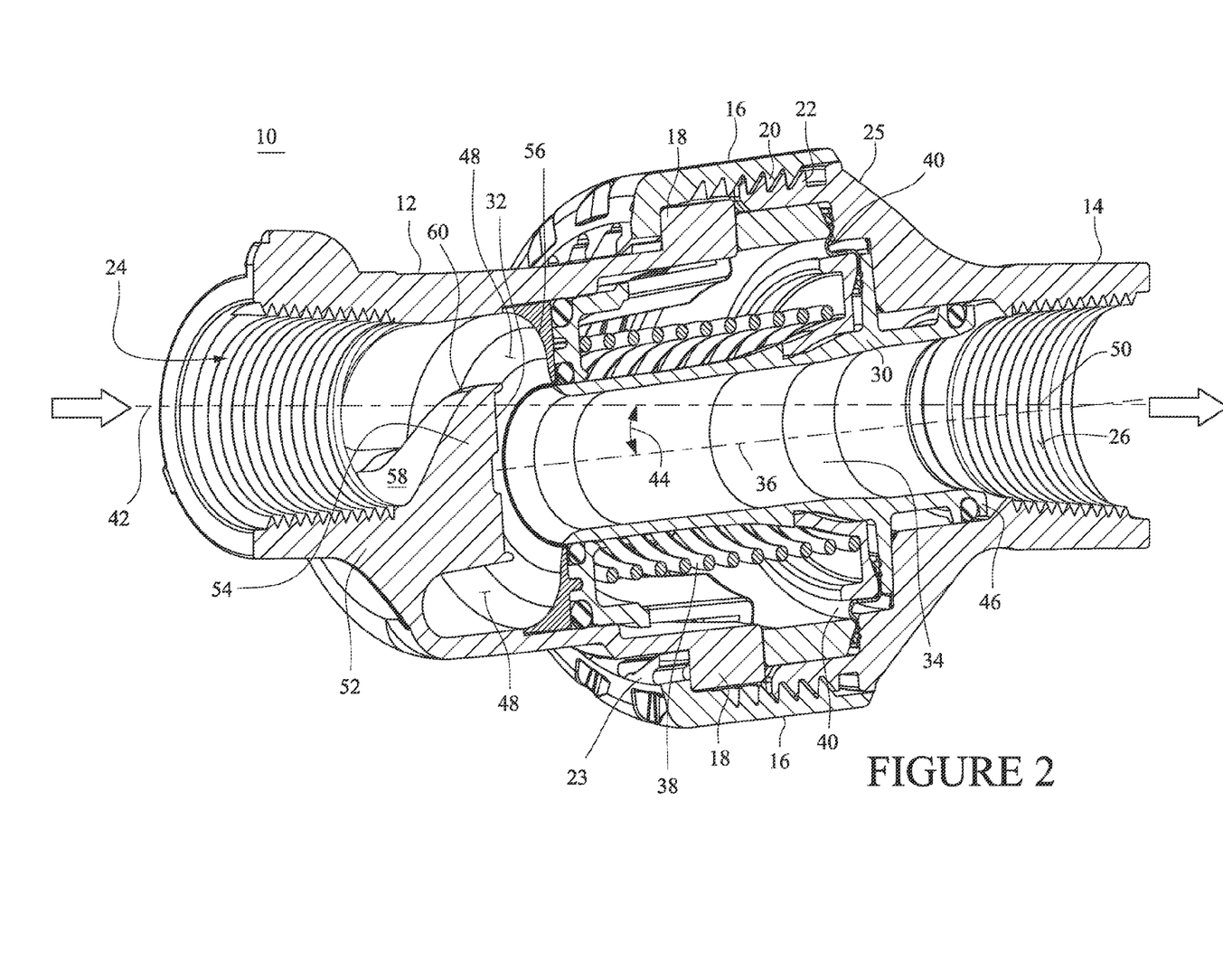
FIG. 2 is a perspective view of the inlet and side of the pressure regulator shown in cross section.
Figure 3:
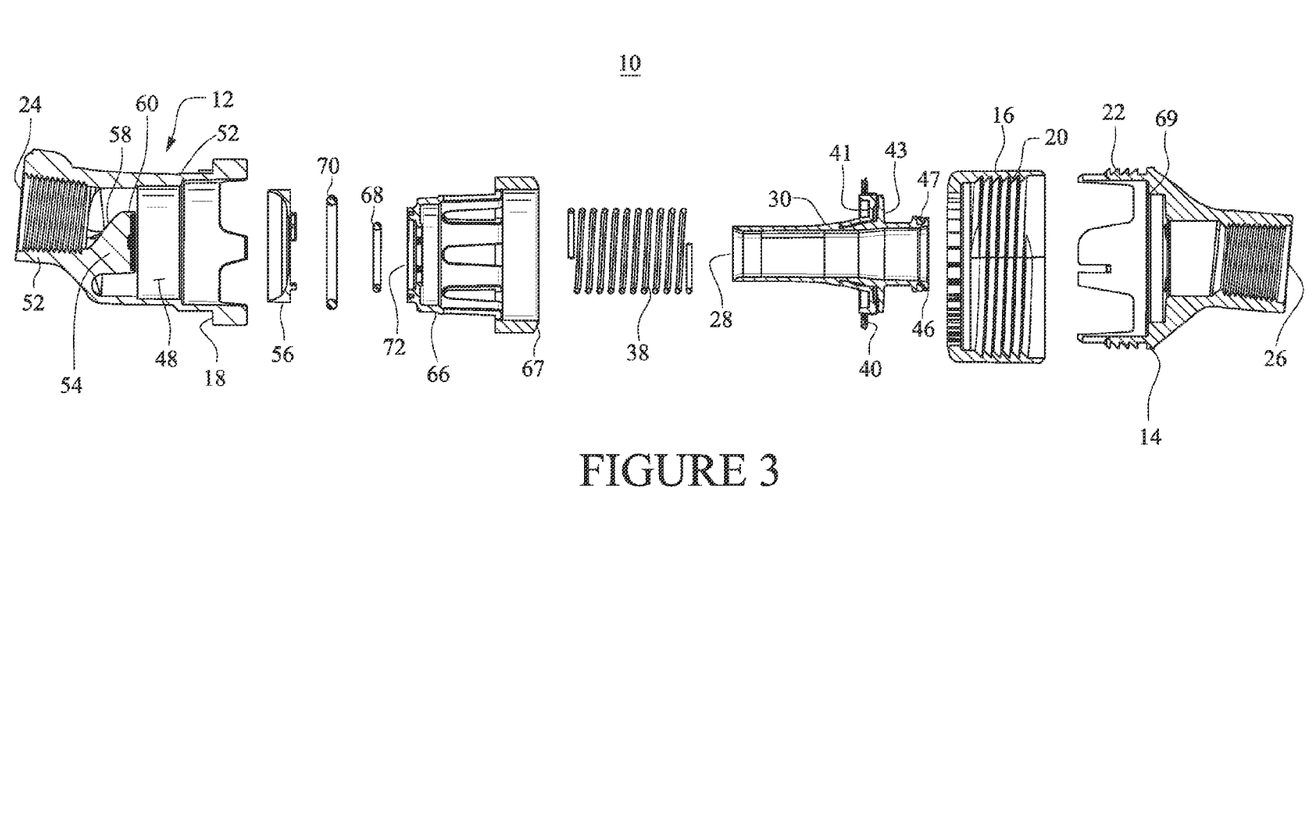
FIG. 3 is an exploded view of the pressure regulator showing each component in cross section.

FIGS. 1 to 3 show a flow-through type pressure regulator 10 in perspective, cross-sectional and exploded views respectively. The pressure regulator 10 includes a housing formed by an inlet cap 12 and an outlet cap 14. The inlet and outlet caps are connected by an annular retainer 16 that engages a ring ledge 18 on the inlet cap and includes a threaded inner surface 20 that engages a threaded outer surface 22 on the outlet cap. The threaded outer surface 22 may be cylindrical or an annular series of legs, as shown in FIG. 3. Similarly, the inlet cap may have legs that interleave with the legs of the outlet cap when the caps are clamped together by the retainer. The inlet cap 12, outlet cap 14 and retainer 16 form the housing of the pressure regulator.

The inlet cap 12 includes an inlet flow passage 24, and the outlet cap 14 includes an outlet flow passage 26. Ribs 25 on the inlet and outlet caps provide structural support for the inlet and outlet flow passages. The inlet and outlet flow passages may have threaded surfaces to receive water pipes (not shown) connected to the pressure regulator. The water pipe connected to the inlet flow passage provides water under pressure to the pressure regulator from a water supply pipe. A vertical water pipe (not shown) typically connects the pressure regulator to the water supply pipe. The outlet flow passage 26 may be connected to a sprinkler assembly that hangs or is otherwise supported by the pressure regulator.

The retainer 16 securely holds together the inlet cap 12 and the outlet cap 14. A secure connection between the inlet cap and outlet cap is needed to support the sprinkler assembly, avoid leakage of water from the pressure regulator and avoid separation of the pressure regulator. The retainer 16 may include an annular array of teeth 23 to engage teeth 21 (FIGS. 1 & 7) on the outer surface of the inlet cap. The engagement between the teeth locks the retainer to the inlet cap. The retainer 16 may be replaced by bolts and nuts, or other fasteners, that secure together the inlet cap and outlet cap.

Figure 4:
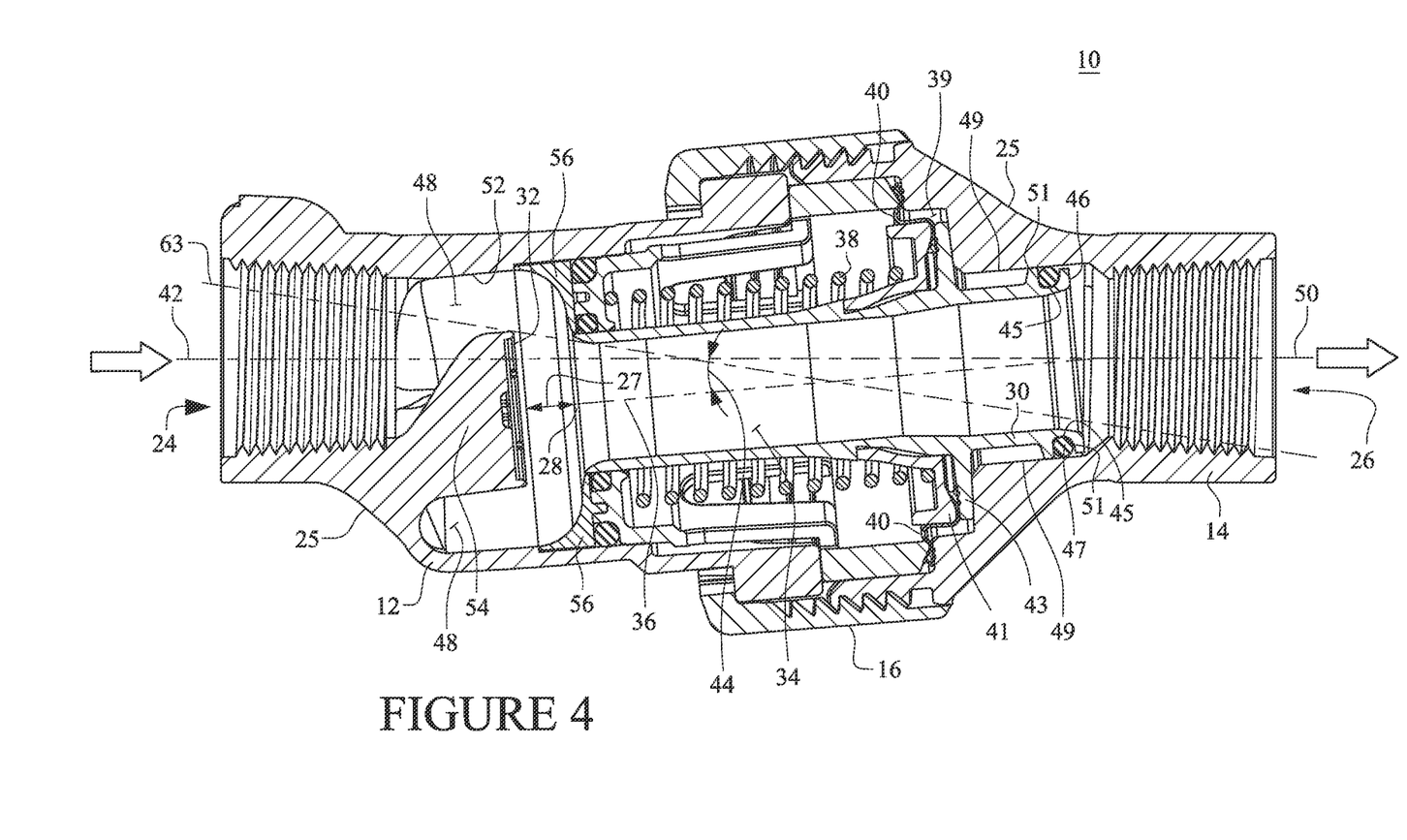
FIG. 4 is a side view showing the pressure regulator in cross section with the plunger retracted.
Figure 5:
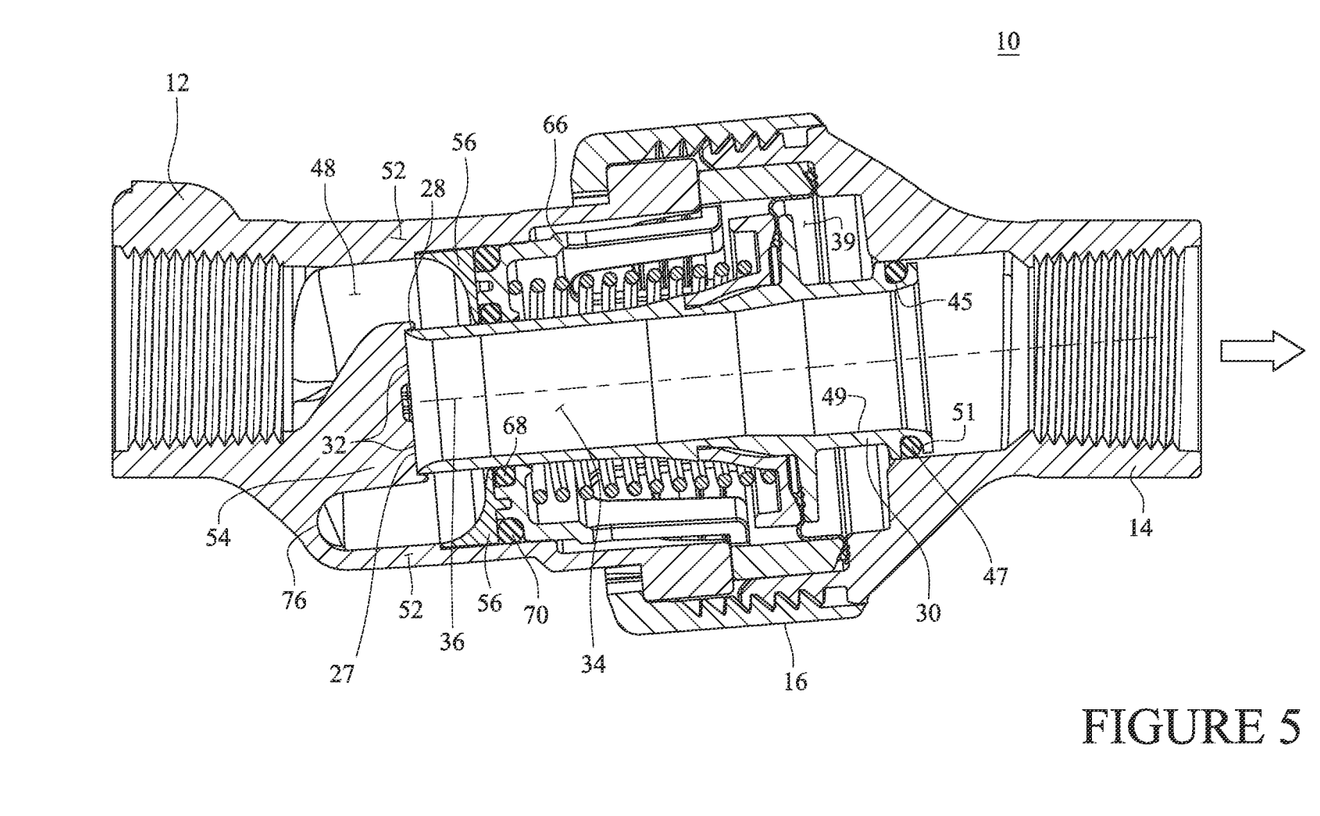
FIG. 5 is a side view showing the pressure regulator in cross section, with the plunger advanced against the valve seat.

FIGS. 4 and 5 show the pressure regulator 10 in cross section. FIG. 4 shows a wide gap 27 in the flow passage through the regulator. FIG. 5 shows a substantially closed gap 27 that blocks the water passage. The pressure regulator 10 reduces the water pressure to maintain a constant water pressure in the outlet flow passage 26, regardless of the water pressure in the inlet flow passage 24.

To maintain a uniform outlet water pressure, the pressure regulator 10 widens or narrows the gap 27 depending upon the outlet water pressure. The gap 27 is the most constricted portion of the flow passage in the pressure regulator. The width (see double arrow in FIG. 4) of the gap 27 adjusts automatically in response to the outlet water pressure. The gap 27 is widest while the water pressure in the outlet flow passage 26 is no greater than a prescribed pressure level. The prescribed pressure level may be set during the design of the pressure regulator and is dictated by the rate of the spring (also known as the spring constant). The gap 27 narrows (FIG. 5) if the water pressure in the outlet flow passage 26 exceeds the prescribed pressure. Narrowing the gap 27 results in a corresponding reduction in water pressure at the outlet of the regulator.

The gap 27 is formed between an inlet 28 to a tubular plunger 30 and a stationary valve seat 32. The size of the gap 27 is determined by the axial position of the plunger inlet 28 relative to the valve seat 32. An annular section or circular disc of the valve seat is sized to receive the circular inlet 28 to the plunger to close the gap. The plunger 30 includes a cylindrical plunger passage 34 for water flowing between the inlet flow passage 24 and the outlet flow passage 26. The plunger 30 moves along its axis 36 within a short range of distances. The range of distances that the plunger moves corresponds to the gap 27. The range is evident by comparing the plunger position in FIG. 4 with the plunger position in FIG. 5. The movement of the plunger advances or retracts its inlet 28 towards and away from the valve seat 32.

A helical spring 38 biases, e.g., pushes, the plunger towards the outlet cap 14 and away from the valve seat 32. Water pressure in the outlet flow passage 26 is substantially the same as the water pressure in the diaphragm chamber 39 because there is fluid communication around and through the damper O-ring 47 and gland 45 which seats the O-ring. The water pressure in the diaphragm chamber pushes the plunger towards the valve seat by acting on an effective annular area of the diaphragm 40 attached to the plunger. While the pressure in the diaphragm chamber 39 is at or below the prescribed pressure level, the spring force applied to the plunger and diaphragm is greater than the force due to water pressure applied to the diaphragm. The side of the diaphragm opposite to the outlet flow passage may be at an ambient pressure, which is achieved by venting the liner 66 to the atmosphere through vent holes in the liner and through a torturous path provided by the retainer's buttress thread 20.

As the water pressure at the diaphragm chamber 39 increases beyond the prescribed pressure, the pressure applied to the diaphragm 40 overcomes the spring force and moves the plunger 30 towards the valve seat 32 to narrow the gap 27. The narrowing of the gap 27 reduces the water pressure in the diaphragm chamber 39. The reduced water pressure lessens the pressure applied to the diaphragm 40 and allows the spring 38 to retract the plunger 30 to widen the gap 27. The offsetting spring force and water pressure determine the width of the gap 27 and regulate the water pressure at the diaphragm chamber 39.

An O-ring 47 is fitted loosely within the downstream plunger guide bore 49 and retained in an annular gland 45 on the downstream end of the plunger 30. The O-ring may be fitted to allow approximately 0.007 to 0.015 inches (0.178 to 0.38 millimeters) of radial clearance within the guide bore 49.

A shallow axial bleed groove(s) 51 may be formed in connection with or between the O-ring 47 and the gland 45 on the plunger to provide pressure communication between the outlet flow passage 26 and the diaphragm chamber 39. The axial bleed grooves 51 may have a depth of 0.005 to 0.010 inches (0.127 to 0.254 millimeters). The axial bleed grooves may be symmetrically arranged within the gland 45 or formed on the inner cylindrical surface of the bore 49. The bleed grooves may also be formed between ribs on the O-ring 47. At normal operation, both the radial clearance and axial bleed groove(s) provide fluid communication between the outlet flow passage 26 and an annular chamber 39 between the diaphragm and an inner surface of the outlet cap 14.

A sudden inlet pressure surge will cause the O-ring 47 to compress in an axial direction and deform the O-ring outward diminishing the radial clearance between the ring and the bore 49. The deformation of the O-ring creates a friction that slows the axial movement of the plunger 30 toward the seat 32. While the O-ring is deformed, the radial clearance reduces to zero and the axial bleed groove provides the primary fluid communication to the diaphragm chamber. Reducing the radial clearance and increasing friction between the O-ring and bore prevents a resonance in the movement of the plunger.

Because the axial bleed grooves ensure that there is always some fluid communication with the diaphragm chamber, a hydraulic lock in the diaphragm chamber does not form. As the pressure surge subsides, the O-ring 47 returns to its free shape which restores the radial clearance and allows the plunger to more easily slide in the bore. The spring 38, diaphragm 40 and other components of the regulator are designed, in a conventional manner, to achieve a desired water pressure at the outlet of the regulator 10.

The diaphragm 40 may be an annular, flexible skirt secured to the plunger between a diaphragm retainer 41 and a plunger flange 43. The diaphragm retainer 41 may slide over the tube of the plunger and snap into a groove around the circumference of the tube. The plunger flange 43 may be integral with the tube of the plunger. Before the diaphragm retainer 41 is snapped in place on the tube of the plunger, the diaphragm 40 is placed between the plunger flange and diaphragm retainer. The diaphragm is secured between the diaphragm retainer 41 and plunger flange 43, by snapping the diaphragm retainer on the tube of the plunger. The diaphragm is secured to the housing of the pressure regulator by being clamped between the downstream rim 67 (FIG. 3) of the liner and an annular rim 69 in the outlet flow cap 14.

The plunger 30 has an axis 36 offset from the axis 42 of the inlet flow passage 24. The offset may be an angular offset 44 in a range of about three to twelve and one-half degrees. Test indicates that angular offsets in a range of three to eight degrees, such five degrees, provide optimal regulator performance by minimizing turbulence and nonuniform flow at the outlet of the regulator, suppressing clogging of the gap by debris and minimizing pressure losses through the regulator. The plunger axis 36 projects into the inlet flow passage 24.

The plunger axis 36 may intersect the axis 42 of the inlet cap near the downstream end 46 of the plunger 30. Offsetting the plunger axis 36 is contrary to the conventional approach that aligns the axis of the plunger with the axes of the inlet and outlet flow passages. Intersecting the plunger axis 36, the end of the plunger aligns the outlet of the plunger with the outlet flow passage, where the outlet axis 50 is coaxial with the inlet flow axis 42.

The axis 50 of the outlet flow passage 26 may be coaxial to the axis 42 of the inlet flow passage 24. Having these axes 42, 50 coaxial minimizes force moments applied to the pressure regulator by the inlet and outlet water pipes attached to the regulator. Having these axes 42, 50 coaxial also assists in achieving vertical alignment along the inlet pipe, pressure regulator, outlet water pipe and the sprinkler. A sprinkler typically works best, e.g., projects a symmetrical water spray pattern, if its rotational axis is vertical.

Figure 6:
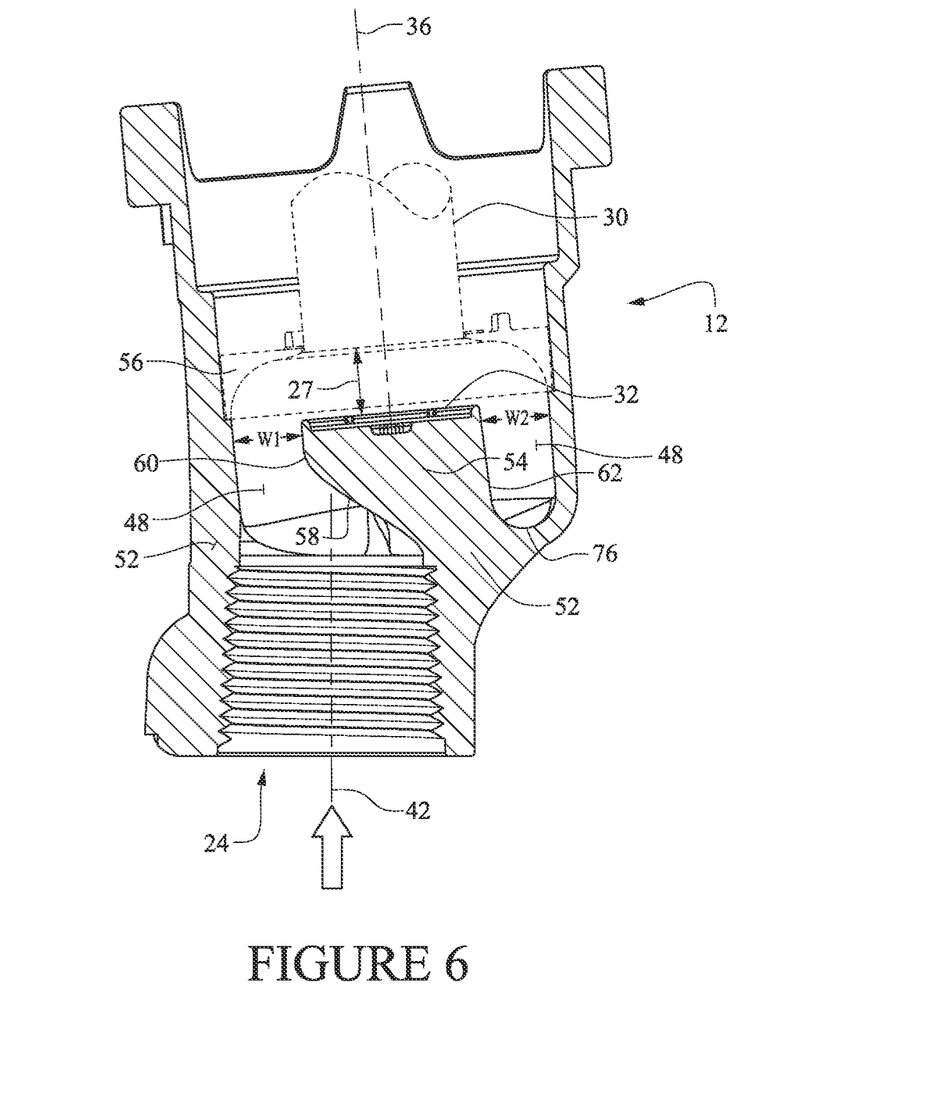
FIG. 6 is a side view of the inlet cap of the pressure regulator in cross section.
Figure 7:
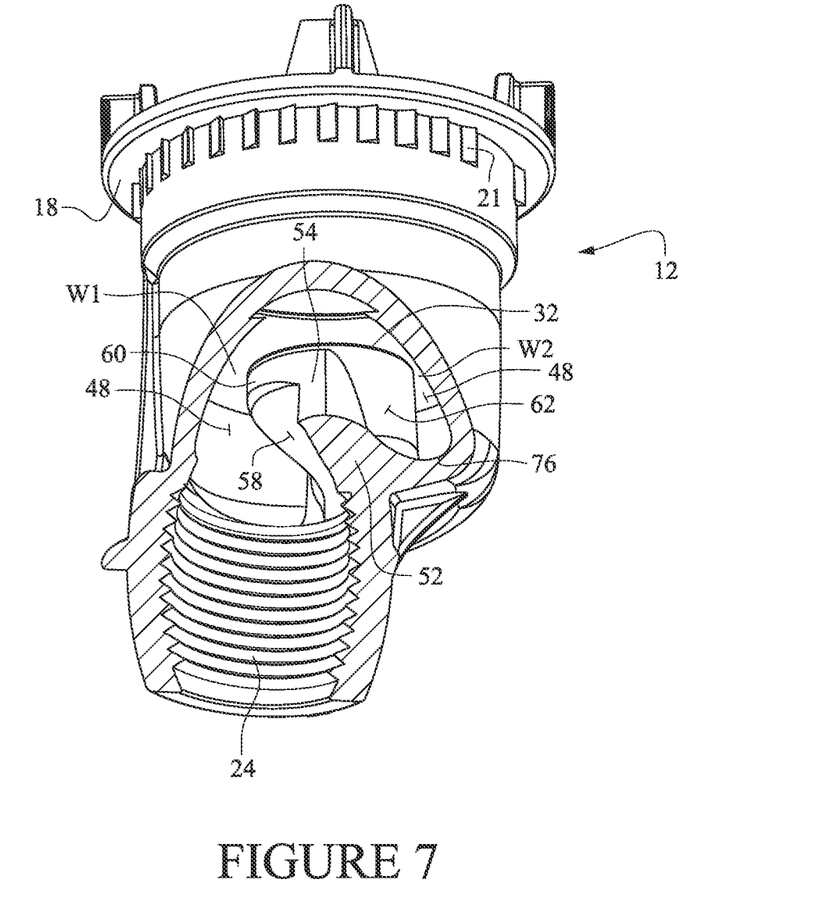
FIG. 7 is a perspective view of the inlet cap with a portion of the inlet cap cut away.
Figure 8:
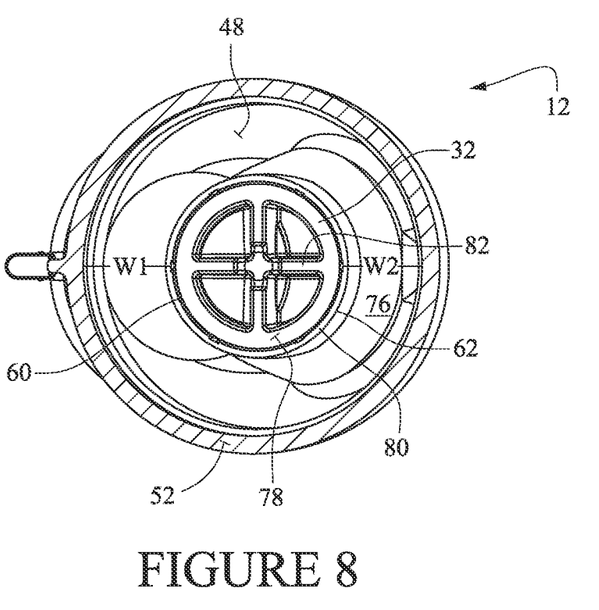
FIG. 8 is an end view showing the outlet end of the inlet cap.

FIGS. 6, 7 and 8 illustrate the inlet cap 12 in a cross-sectional view, perspective view with a portion of the cap cut away and an end view, respectively. The plunger 30 and annular seal retainer 56 are shown by dotted lines to illustrate the gap 27 and a chamber 48 of the flow passage surrounding the valve seat 32 and strut 54.

The strut 54 may be a single strut having an upstream surface 58, a nose 60, and a back surface 62 that is generally parallel to the plunger axis 36. The nose 60 and back surface 62 may form a generally cylindrical post section of the strut extending downstream into chamber 48. The upstream surface 58 of the strut slopes from the sidewall 52 of the inlet cap 12. The side edges of the upstream surface 58 extend to the back surface 62 of the strut. The strut may be embodied with various shapes including the generally triangular shape attached to the sidewall and downstream post shown in FIG. 2. For example, the post section of the strut may be more pronounced than shown in FIG. 2. The strut extends downstream into the chamber 48, which is in contrast to conventional cantilevered-beam struts that extend solely radially into the flow stream.

The upstream surface 58 of the strut may be smooth with a slight convex cross-sectional shape in a direction parallel to the plunger axis 36. The upstream surface 58 of the strut facing the water flow is at a steep slope, such as at an angle in a range of twenty-five to fifty-five degrees. The steep slope of the upstream surface 58 deflects debris off the strut and into a gap (W1) of the flow chamber 48. Debris reaching the upstream surface 58 is swept by the water flow along the upstream surface and off the nose 60 of the strut.

The chamber 48 is formed between the sidewall 52 of the chamber 48, the outer surfaces of the valve seat 32 and strut 54, and the upper surface of an annular seat retainer 56. Water enters the chamber 48 from the inlet flow passage 24 and leaves the chamber by flowing into the plunger inlet 28. The chamber 48 surrounds the valve seat 32 and strut 54, and has a larger cross section than the cross section of the inlet flow passage 24. The large cross section of the chamber 48 provides a relatively large volume of water to flow over and around the strut 54 and into the inlet flow passage 24. The distance (W1) between the nose 60 (also the front) of the strut and the sidewall 52 may be substantially the same as the distance (W2) between the back of the strut and the sidewall 52. The large chamber 48 and the substantially equal distances (W1, W2) between the strut 54 and the sidewall 52 provide an open flow passage that is substantially free of areas of stagnant flow in the chamber where debris may accumulate. Further, the chamber 48 is free of radially projecting spokes, beams, ribs, vanes and other radially extending supports conventionally used for a valve seat.

Offsetting the plunger axis 36 allows the strut 54 and valve seat 32 to be shifted down into the expanded chamber 48. Due to the shift, the valve seat and strut may be positioned closer to and integrated with the threaded sidewall 52 of the inlet flow passage 24, as compared to a conventional cantilever beam strut extending radially to the center of the flow passage.

The strut and valve seat may be shifted sufficiently away from the inlet axis 42 such that a line of sight 63 (FIG. 4) exists through the inlet flow passage, the plunger and the outlet flow passage. The line of sight represents an unobstructed flow path through the inlet cap, plunger, and outlet cap when the plunger is in its fully or substantially open state.

Figure 10:
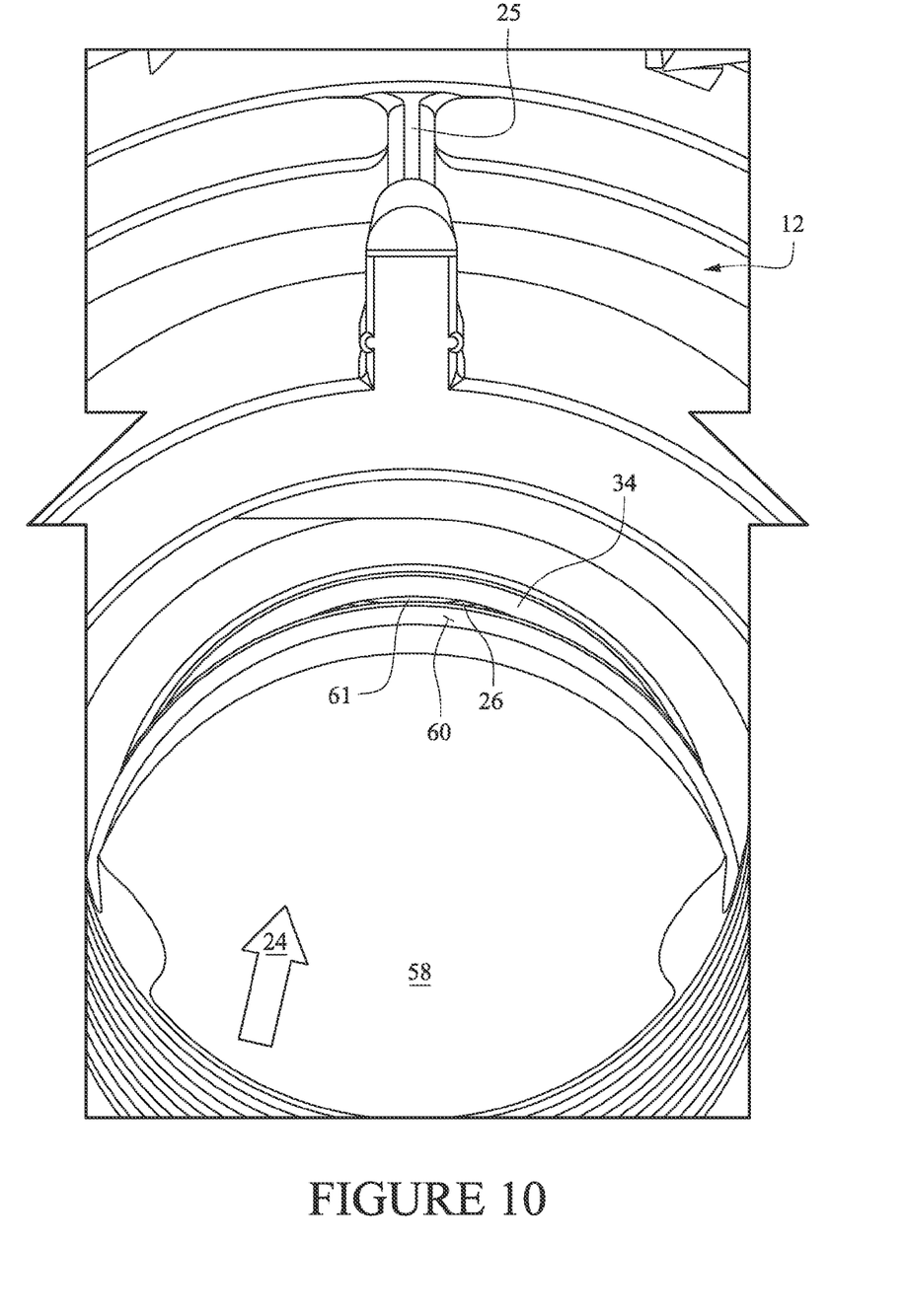
FIG. 10 is an enlarged end view of the inlet end of the inlet cap, normal to line of sight.

FIG. 10 is an enlarged view of the upstream surface 58 and nose 60 of the strut. A lune 61 is formed by the overlap of the inlet and outlet flow passages 24, 26, wherein the lune 61 is not obstructed (fully or partially) by the strut 54. The line of sight 63 in FIG. 4 extends through the lune 61. The significance of the line of sight 63 and the lune 61 is to illustrate that shifting the strut and valve seat forms a more open and less obstructed flow passage through the regulator than occurs when the strut and valve seat are centered in the flow passage. Increasing the openness and reducing obstructions in the flow passage should reduce the frictional pressure loss in the regulator and reduce the tendency of debris to clog the flow passage.

The flow path through the inlet flow passage 24, through the chamber 48 and into the plunger 30 is relatively uninterrupted and smooth. The flow path may be free of radially extending support beams, ribs and spokes that, if present, could disrupt the flow. The sloping upstream surface 58 of the strut 54 extends from the sidewall of the inlet flow passage 24 to the chamber 48 and further to the nose 60 of the strut.

The upstream surface 58 of the strut starts in or at the end of the inlet flow passage 24 and is upstream of the chamber 48. The upstream surface 58 starts radially inward of the sidewall of the chamber 48 due to the angular offset 44 and as shown in FIG. 4. The upstream surface 58 directs water into the chamber and around the strut. A portion of the water flowing from the inlet flow passage 24 directly enters the chamber 48, and does not directly contact the strut. Another portion of the water flows over and around the upstream surface 58 to enter the chamber and around the back surface 62. As evident from FIGS. 6 and 7, and a comparison of FIGS. 8 and 10, the projected area of the upstream surface 58 on a plane perpendicular to the axis of the inlet passage is smaller than the area within the circumference of the valve seat 32.

Water from the inlet flow passage 24 enters the chamber 48. Much of the water flows through the front region (W1) of the chamber 48 and into the plunger while avoiding the strut. Avoiding the strut reduces the amount of turbulence created as the water flows through the chamber 48. Water that flows over the upstream surface 58 of the strut may be deflected into the plunger or may flow to the chamber back region (W2) behind the strut. The water in the back region gap (W2) flows to gap 27 and into the plunger. The shape of the chamber 48 and the relatively large regions (W1, W2) and the bowl shape of the upstream surface of the annual seal retainer 56 contribute to minimizing turbulence and flow velocity variations in the water flowing through the chamber 48 and into the plunger.

Figure 9:
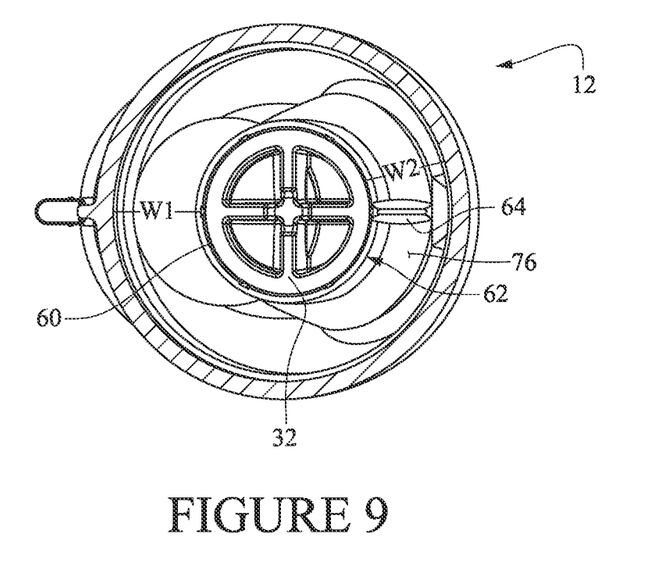
FIG. 9 is an end view showing the outlet end of an inlet cap having an internal vane to direct water flow.

A vane 64 (FIG. 9) in the region (W2) may be used to direct the flow towards the plunger and reduce turbulence in the flow. The vane 64 is optional and is not shown in the embodiments in FIGS. 1 to 8. The vane 64 may be integral with the inlet cap and fixed to an overhang 76 between the back surface 62 of the strut and the sidewall 52 of the chamber. The vane deflects water flowing around the strut towards the plunger. The vane may be a planar rib, have an inverted V-shape or another shape that deflects water towards the plunger.

The relatively large flow volume in the chamber 48 tends to reduce frictional losses in the water pressure. The frictional pressure loss may be less than five (5) pounds per square inch (34 kPa) while the pressure regulator is operating at a maximum water flow. The reduction in the frictional pressure loss is due, in part, to the relatively high hydraulic diameter of the chamber 48. The hydraulic diameter is the ratio of the cross-sectional area of the chamber 48 and the total length of the wetted perimeter of the chamber 48 and the strut at said cross section.

Turbulence and velocity variations in the flow entering the plunger settle out as the water flows through the plunger passage. A plunger passage 34 having a flow length equal to at least five diameters of the passage is generally sufficient to settle turbulence and velocity variations. The length of the plunger may also be selected such that axis 36 of the plunger intersects the axis 50 of the outlet flow passage 26 in the outlet cap.

The annular seal retainer 56 rests in an annular recess in the sidewall 52 of the inlet casing and seats on a tubular liner 66 for the spring 38. The inlet end of the plunger 30 extends through a center circular opening in the seal retainer 56. The upstream surface of the seal retainer has a bowl shape with gradually curved walls to direct water towards the inlet 28 of the plunger. The center circular opening of the seal retainer 56 is coaxial with and adjacent a dynamic O-ring seal 68 that fits around the inlet of the plunger.

The O-ring seal 68 is dynamic in that the plunger moves reciprocally against the O-ring. The dynamic O-ring seal 68 and a static O-ring seal 70 seat in annular grooves on the upstream face 72 of the liner 66. The O-ring seals 68, 70 prevent higher pressure water in the chamber 48 from seeping between the plunger and the liner 66 and sidewall 52.

The strut 54 may have a generally triangular shape and a downstream post as is shown in FIG. 6. The apex of the triangle is integrated with the inlet cap and is aligned with the sidewall of the inlet flow passage 24. The legs of the triangle are formed by the upstream surface 58 and the back surface 62 of the strut. The triangular shape provides a strong supporting brace for the valve seat 32, which is at the base of the triangle. A triangular brace shape is suited to support the valve seat and withstand a water flow, especially as compared to a conventional cantilevered beam strut.

As shown in FIG. 8, the valve seat 32 may be an annular surface 78 in a plane parallel to the inlet 28 of the plunger. A raised ridge 80 at the circumference of the annular surface 78 guides the plunger inlet 28 to the annular surface. The valve seat and strut may be generally hollow with supporting ribs 82 forming an X-brace within the hollow area of the strut.

Figure 11:
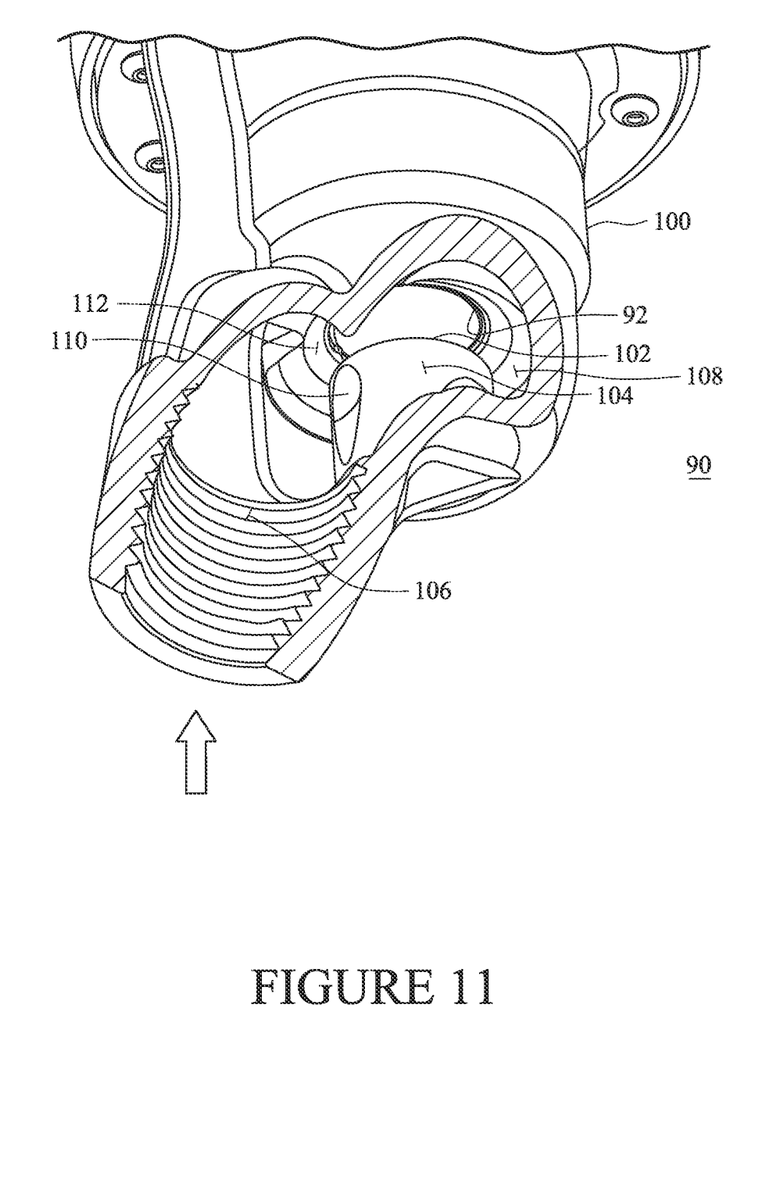
FIG. 11 is a perspective view of another inlet cap with a portion of the inlet cap cut away.

FIG. 11 is a perspective view of an inlet cap 100 for an alternative pressure regulator 90 having a plunger 92 with an axis offset by about twelve and one-half degrees from the axis of the inlet passage. The large angular offset shifts the valve seat 102 and seat post 104 nearly entirely out of the inlet flow passage 106. The seat post 104 is the support strut for the valve seat.

The seat post 104 forms a support post for the valve seat 102. The seat post 104 is substantially a cylindrical post projecting downstream from an overhang section 108 of the sidewall of the inlet cap 100. The seat post 104 may be integral with the inlet cap. The inlet cap, with the strut and valve seat, may be formed as a single component by plastic injection molding, utilizing unwinding core technology. The upstream surface 110 of the strut is on the side of the cylindrical strut. The upstream surface 110 may be shaped to blend the strut with the overhang section 108 or to direct water flow down into a chamber 112 downstream of the inlet flow passage 106 and upstream of the inlet to the plunger 92. The upstream surface 110 may be formed from the unwinding core forming inlet flow passage 106.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A pressure regulator comprising:
   a housing including an inlet flow passage and an outlet flow passage;
   a plunger reciprocally mounted in the housing and including a plunger flow passage having an axis offset from an axis of the inlet flow passage, wherein the axis of the inlet flow passage intersects the axis of the plunger flow passage downstream of a stationary valve seat; and
   the stationary valve seat is fixed to the housing and is immobile with respect to the housing,
   wherein the stationary valve seat is positioned between the inlet flow passage and an inlet to the plunger flow passage, and the valve seat is configured to receive and abut the inlet to the flow passage of the plunger.

2. The pressure regulator of claim 1 wherein the offset is an angular offset between the axis of the plunger flow passage and the axis of the inlet flow passage, wherein the angular offset is in a range of three to twelve and one-half degrees.

3. The pressure regulator of claim 1 wherein the stationary valve seat and an inlet cap of the housing are a single-piece component.

4. The pressure regulator of claim 1 wherein the axis of the inlet flow passage is coaxial with an axis of the outlet flow passage, and the axis of the plunger flow passage intersects the axis of the inlet flow passage proximate to an outlet of plunger flow passage.

5. The pressure regulator of claim 1 further comprising an annular diaphragm coupling the plunger to the housing, wherein the diaphragm forms a deformable seal between the outlet flow passage and a chamber in the housing at an ambient pressure.

6. The pressure regulator of claim 1 further comprising a strut supporting the stationary valve seat and attached to an upstream interior wall of the housing, wherein the strut extends downstream from the interior wall to the stationary valve seat.

7. The pressure regulator of claim 6 wherein the strut includes an upstream surface sloping in a downstream direction along the entire length of the upstream surface from the interior wall to a nose of the strut.

8. The pressure regulator of claim 6 wherein the strut includes a downstream cylindrical section coaxial with the axis of the plunger.

9. The pressure regulator of claim 6 wherein the housing includes an inlet cap and an outlet cap, and the strut and inlet cap are a single piece.

10. The pressure regulator of claim 9 wherein the inlet cap and strut are a single plastic component.

11. The pressure regulator of claim 6 further comprising a vane between the strut and an interior surface of the housing.

12. The pressure regulator of claim 6 wherein the strut extends radially inward into the inlet flow passage less than a distance across a surface of the valve seat facing an inlet to the plunger flow passage.

13. The pressure regulator of claim 1 wherein a line of sight extends through the regulator that passes through the inlet flow passage to the outlet flow passage.

14. The pressure regulator of claim 1 wherein said flow path is devoid of radially extending support beams, ribs and spokes.

15. The pressure regulator of claim 1 wherein the axis of the inlet flow passage intersects a surface of the valve seat facing an inlet to the plunger flow passage.

16. The pressure regulator of claim 15 wherein the valve seat includes a valve seat surface facing an end of the plunger, and a center of the valve seat surface is offset from the axis of the inlet flow passage.

17. The pressure regulator of claim 1 further comprising a chamber within the housing and between the inlet flow passage and the plunger flow passage, wherein the valve seat is within the chamber, and a distance between a wall of the chamber and one edge of a downstream surface of the valve seat equals a distance between an opposite edge of the downstream surface of the valve seat and the wall of the chamber.

18. The pressure regulator of claim 17 wherein the one edge of the downstream surface of the valve seat is at a nose of the valve seat.

19. The pressure regulator of claim 1 wherein the axis of the plunger flow passage projects into the inlet flow passage.

20. The pressure regulator of claim 1 wherein the valve seat includes a downstream valve seat surface and an upstream surface facing into the inlet passage, wherein a projected surface area of the upstream surface as projected on a plane perpendicular to the axis of the inlet flow passage is less than an area within a perimeter of the valve seat surface.

21. A pressure regulator comprising:
a housing including an inlet cap having an inlet flow passage and an outlet cap having an outlet flow passage;
a tubular plunger reciprocally mounted in the housing;
a flow passage including the inlet flow passage, the plunger and the outlet flow passage;
a stationary valve seat fixed to and immobile with respect to the inlet cap, wherein the stationary valve seat is positioned between the inlet flow passage and an inlet to the plunger, and the stationary valve seat is configured to receive and abut the inlet to the plunger; and
a strut supporting the stationary valve seat, wherein the strut and the inlet cap are a single piece component,
wherein the axis of the plunger is offset from an axis of the inlet flow passage and the axes of the inlet flow passage and the plunger intersect downstream of the stationary valve seat.

22. The pressure regulator of claim 21 wherein the offset is an angular offset, and the axis of the plunger intersects the axis of the inlet flow passage proximate to a downstream end of the flow passage.

23. The pressure regulator of claim 21 wherein the offset is an angular offset and the angle of the offset is in a range of three to eight degrees.

24. The pressure regulator of claim 21 wherein the inlet cap and strut are a pressure-injected molded plastic component.

25. The pressure regulator of claim 21 further comprising an annular diaphragm coupling the plunger to the housing, wherein the diaphragm forms a deformable seal between the outlet flow passage and a chamber in the housing at an ambient pressure.

26. The pressure regulator of claim 21 wherein the strut includes an upstream surface sloping in a downstream direction along the entire length of the upstream surface from the interior wall of the inlet to a distal circumferential edge.

27. The pressure regulator of claim 21 wherein the strut includes a downstream cylindrical section coaxial with the axis of the plunger.

28. The pressure regulator of claim 21 wherein said flow passage is devoid of radially extending support beams, ribs and spokes.

29. A pressure regulator comprising:
a housing including an inlet cap having an inlet flow passage and an outlet cap having an outlet flow passage;
a tubular plunger reciprocally mounted in the housing;
a flow passage including the inlet flow passage, the plunger and the outlet flow passage;
a stationary valve seat connected to the housing and positioned between the inlet flow passage and an inlet to the plunger, wherein the valve seat is configured to receive and abut the inlet to the plunger;
a strut supporting the valve seat, wherein the strut is integral with the inlet cap, and
wherein an unobstructed flow path is visible as a lune through the inlet cap, plunger, and outlet cap when the plunger is in a fully open position.

30. A pressure regulator comprising:
a housing including an inlet flow passage and an outlet flow passage;
a plunger reciprocally mounted in the housing and including a plunger flow passage between the inlet flow passage and the outlet flow passage;
a valve seat within the housing and positioned between the inlet flow passage and an inlet to the plunger flow passage, wherein the inlet to the plunger flow passage moves between the valve seat and an open position as the plunger reciprocates; and
a center of an inlet to the plunger flow passage is offset from an axis of the inlet flow passage and the axis of the inlet flow passage intersects a surface of the valve seat facing the inlet to the plunger flow passage.

31. The pressure regulator of claim 30 wherein the valve seat is stationary and fixed to the housing.

32. The pressure regulator of claim 30 further comprising a strut supporting the valve seat and attached to the housing, wherein the strut extends radially inward into the inlet flow passage less than a distance across the valve seat.

33. The pressure regulator of claim 30 further comprising a strut supporting the valve seat and attached to the housing, wherein the strut includes an upstream surface sloping in a downstream direction along an entire length of the upstream surface from an interior wall of the housing to a downstream edge of the valve seat.

34. The pressure regulator of claim 30 wherein a line of sight extends through the inlet flow passage, the plunger flow passage and the outlet flow passage.

35. The pressure regulator of claim 34 wherein the line of sight exists while the inlet to the plunger is displaced from the valve seat.

36. The pressure regulator of claim 30 further comprising a chamber within the housing and between the inlet flow passage and the plunger flow passage, wherein the valve seat is within the chamber, and a distance between the chamber and one edge of the valve seat equals a distance between an opposite edge of the valve seat and the chamber.

37. The pressure regulator of claim 36 wherein the one edge of the valve seat is at a nose of the valve seat.

38. A pressure regulator comprising:
a housing including an inlet flow passage and an outlet flow passage;
a plunger reciprocally mounted in the housing and including a plunger flow passage between the inlet flow passage and the outlet flow passage, wherein a pressure regulator flow path includes the inlet flow passage, the plunger flow passage and the outlet flow passage;
a valve seat within the housing and positioned between the inlet flow passage and an inlet to the plunger flow passage, wherein the inlet to the plunger flow passage moves between the valve seat and an open position as the plunger reciprocates; and
a line of sight extends through the pressure regulator flow path and through the inlet flow passage, the plunger flow passage and the outlet flow passage while the plunger flow passage is in the open position.

39. The pressure regulator of claim 38 wherein an axis of the plunger flow passage is offset from an axis of the inlet flow passage, and the axes of the inlet flow passage and the plunger intersect downstream of the valve seat.

40. The pressure regulator of claim 38 further comprising a strut supporting the valve seat, wherein the strut extends radially inward into the inlet flow passage less than a distance across a surface of the valve seat facing an inlet to the plunger flow passage.

41. The pressure regulator of claim 40 wherein the strut includes an upstream surface sloping in a downstream direction along an entire length of the upstream surface from an interior wall of the housing to a downstream end of the valve seat.

42. The pressure regulator of claim 41 wherein the valve seat includes a downstream valve seat surface and the strut includes an upstream surface facing into the inlet passage, wherein a projected surface area of the upstream surface as projected on a plane perpendicular to the axis of the inlet flow passage is less than an area within a perimeter of the valve seat surface.

43. A pressure regulator comprising:
a housing including an inlet flow passage and an outlet flow passage;
a plunger reciprocally mounted in the housing and including a plunger flow passage between the inlet flow passage and the outlet flow passage, wherein a pressure regulator flow path includes the inlet flow passage, the plunger flow passage and the outlet flow passage;
a valve seat within the housing and positioned between the inlet flow passage and an inlet to the plunger flow passage, wherein the inlet to the plunger flow passage moves between the valve seat and an open position as the plunger reciprocates; and
an axis of the plunger flow passage is offset from an axis of the inlet flow passage, wherein the axes of the inlet flow passage and the plunger flow passage intersect downstream of the valve seat and the axis of the plunger flow passage projects into the inlet flow passage.

44. The pressure regulator of claim 43 wherein the valve seat includes a valve seat surface facing an inlet to the plunger, and the axis of the inlet flow passage projects through the valve seat surface.

45. The pressure regulator of claim 43 further comprising a strut supporting the valve seat, wherein the strut extends radially inward into the inlet flow passage less than a distance across a surface of the valve seat facing an inlet to the plunger flow passage.

46. The pressure regulator of claim 45 wherein the strut includes upstream surface facing the inlet passage, wherein a projected surface area of the upstream surface as projected on a plane perpendicular to the axis of the inlet flow passage is less than an area within a perimeter of the surface of the valve seat.

* * * * *